United States Patent Office 3,313,944
Patented Apr. 11, 1967

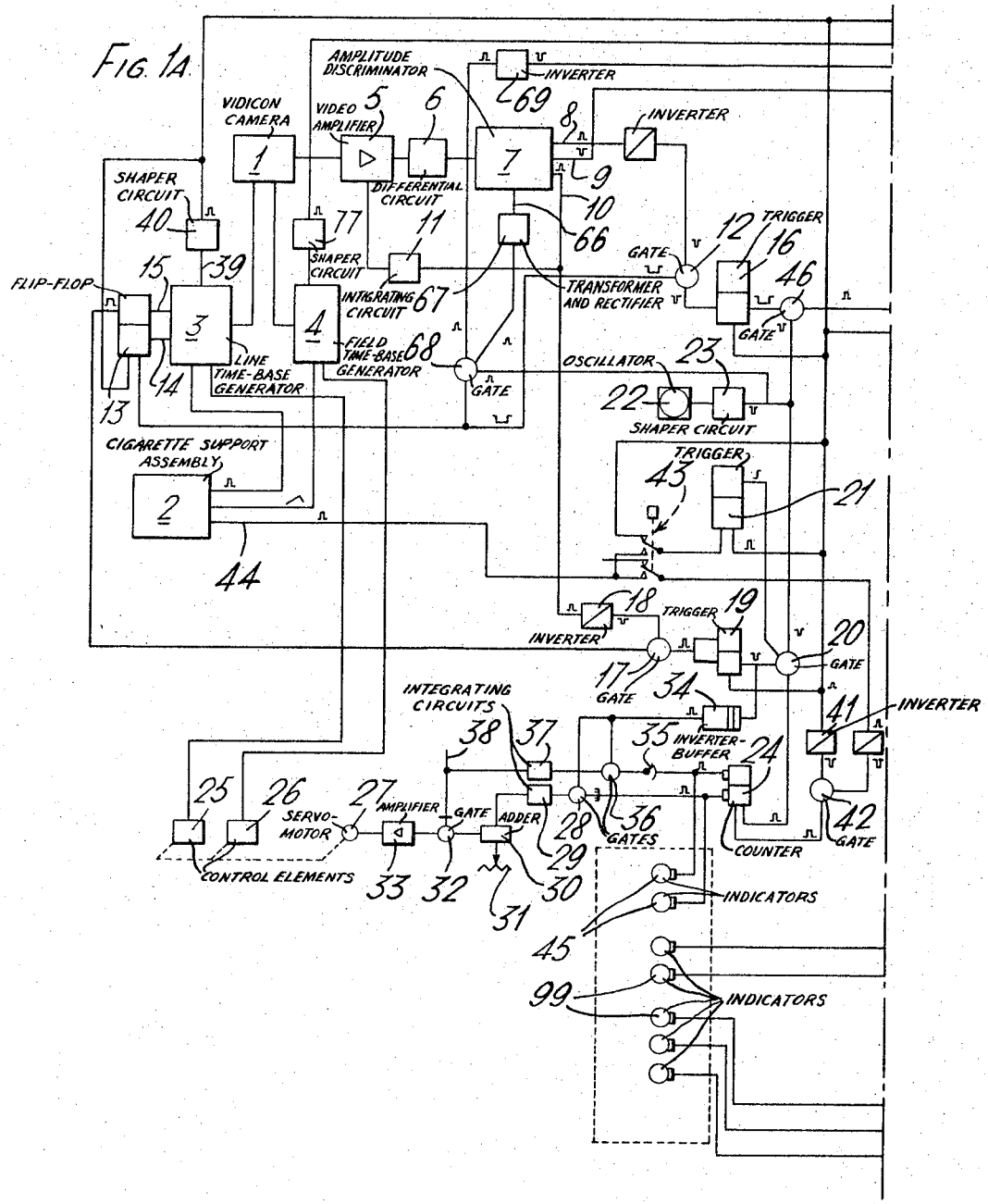

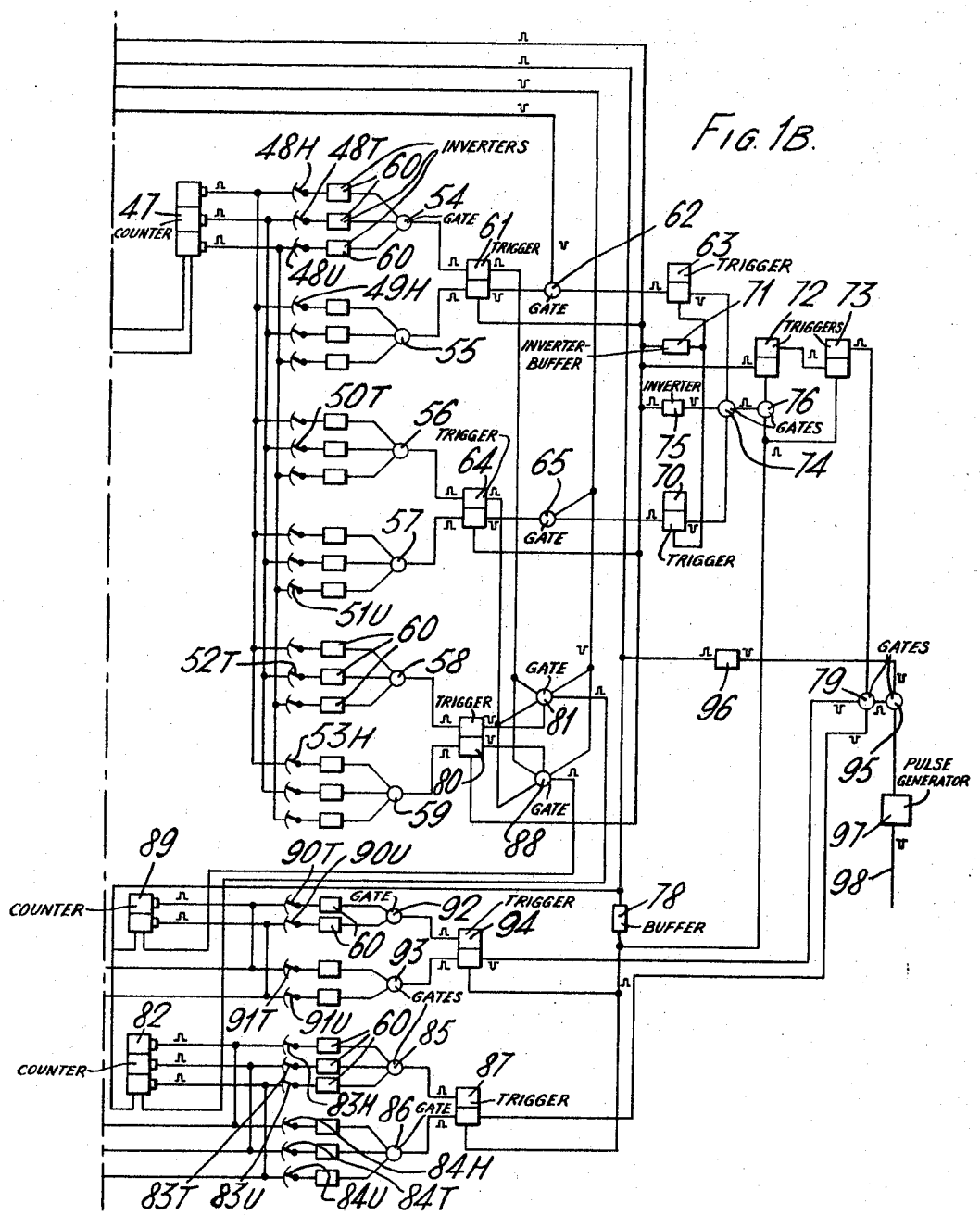

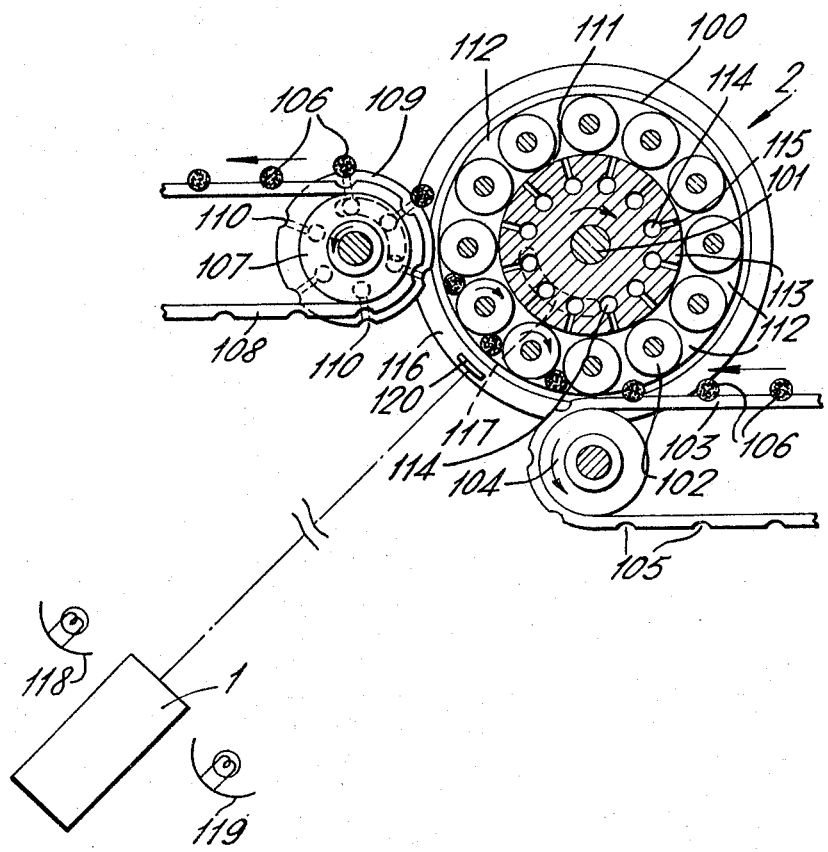

3,313,944
GAUGING APPARATUS INCLUDING AN
ELECTRONIC-OPTICAL SCANNER
Douglas William Ballantyne Muir, London, England, assignor to The Molins Organisation Limited, a British company
Filed Jan. 9, 1964, Ser. No. 336,665
Claims priority, application Great Britain, Jan. 14, 1963, 1,589/63
10 Claims. (Cl. 250—224)

This invention relates to gauging apparatus including an electronic-optical scanner for checking or measuring linear dimensions of articles such as cigarettes and/or markings thereon.

In many manufacturing processes, of which the manufacture of cigarettes will be taken as a convenient example, one or more linear dimensions of the product need to be checked or measured. Thus for a cigarette, one may measure the overall length, the length of a tip portion covered with cork or the like, and the length of an area of printing together with its distance from the end of the cigarette. Furthermore, where printing is involved, it is of advantage if account can be taken of its density. It is most desirable that any apparatus for performing such gauging should be capable of operation at a speed not less than that of a cigarette-making machine, which can be materially in excess of 1,000 cigarettes per minute.

It is an object of the present invention to provide a gauging apparatus for such purposes which can readily be arranged to operate at speeds of the order mentioned.

According to the invention, we provide a gauging apparatus for checking or measuring linear dimensions of articles such as cigarettes, comprising means for scanning an article in a predetermined pattern and producing an electric output representative at any instant of the reflectance of the part of the article then being scanned, an oscillator adapted to operate at constant frequency, and gate means arranged to respond to predetermined changes in said electric output to control delivery of oscillations from said oscillator to at least one counter.

When scanning an object such as a cigarette against a contrasting background, the electric output of the scanning means will change as the scan crosses each end of the cigarette; these output changes will normally be in opposite senses at the two ends of the cigarette in any one scan, and in any event may be employed to "open" and "close" the gating means. Thus oscillations will reach the counter or counters only during the time the scan is passing over the length of the cigarette and the number of oscillations delivered in that time will depend upon the length of the cigarette. If the scanning means is arranged to scan the cigarette at a constant velocity, then the said number of oscillations will be directly proportional to the length.

The sensitivity of measurement possible will be greater for high oscillator frequencies and for low speeds of scanning. In a preferred form of apparatus embodying the invention it is possible to measure to the nearest 0.1 mm. with an oscillator frequency of 2 mc./s. This requires that the speed of scan be such that 0.1 mm. is traversed by the scan in the time of one cycle of oscillation, i.e. the scanning speed should be 2,000 metres per second.

A convenient form of scanning means capable of such speeds comprises a vidicon tube, although alternatively a flying-spot scanner in association with photo-electric detector, i.e. a photo-electric cell or photo-multiplier may be used. The scanning means in either case also includes some form of time-base generator which also is required to maintain a constant frequency. Consistency may be maintained by a feed-back technique, e.g. in a preferred arrangement we provide a pair of markers within the field of scan but sufficiently separated to allow placing of an article to be scanned therebetween. Changes in the electric output arising as the scan encounters these markers are used to control access of oscillations from the oscillator to a further counter and the latter in turn is arranged to supply a D.C. voltage, representing variation from a desired value of the count attained while the scan passes between the markers, to control a servo motor arranged to adjust a frequency control for the time-base generator in a variation-cancelling sense. Said markers conveniently are illuminated slits, providing relatively large and easily distinguishable changes in the electric output.

Apparatus embodying the invention is of course only capable of checking or measuring dimensions between points where the reflectance of an article changes (overall lengths being measurable by arranging a contrasting background for the article during scanning). However, the apparatus may be employed to measure the position of marks on the article and/or the extent of such marks. An example is the printing, e.g. of a brand name, normally found on a cigarette. If the scanning means is arranged to cover a plurality of closely-spaced parallel lines along the length of the cigarette, unduly faint printing will produce a number of small changes in the electric output which can be disregarded by amplitude discrimination to give a response similar to that obtained in the absence of printing. When however the printing is sufficiently contrasted with the body of the cigarette, its extent can be gauged by counting the number of changes of the electric output produced by scanning of the printed area and comparing the total with a predetermined range corresponding to satisfactory printing. The result may be made dependent in part upon the density of print and width of individual print strokes by converting the output changes to discrete triangular pulses of amplitude corresponding to said changes and then employing said pulses to control a gate admitting oscillations from the oscillator to an additional counter, in which case the number of oscillations reaching the counter in response to each pulse will depend upon the pulse width at the level required to open the gate and hence upon the peak amplitude of the pulse which in turn depends upon the density and width of the corresponding print stroke.

While the use of a vidicon tube or the like in the scanning means allows a stationary article to be scanned in a plurality of parallel lines in a conventional rectangular pattern or "raster," with articles such as cigarettes where the surface to be scanned is not plane it is of course necessary to provide means for moving the article scanned so that different areas of the surface of the article are presented for successive lines of scan. For cylindrical articles such as cigarettes, we prefer to provide a plurality of rollers symmetrically mounted on one or more rotatable discs and means for driving both the disc and the rollers in the same sense, so that the surface of a cylindrical article resting between two adjacent rollers moves relatively slowly at right-angles to the direction of scanning. Mechanical or, preferably, photo-electric means may be provided for synchronising the scan with the movement of the article. For example, where the article is carried on rollers as suggested above, we may provide a member rotatable with the rollers and having an arcuate slot of progressively varying width, a light source and photo-electric cell being disposed one on each side of said slot; the photo-electric cell then produces an output representing the rotational position of the article at any instant and such output may be utilised to control the scan.

In order that the invention may be well understood, a preferred embodiment thereof will now be described in detail, referring to the accompanying drawings, in which:

FIGURE 1 is a schematic circuit diagram of an apparatus embodying the invention; and FIGURE 2 is an end view, partly in section, of a cigarette support assembly for use with the apparatus of FIGURE 1.

The apparatus shown includes two elements which are necessarily in physical association with cigarettes to be gauged, namely a vidicon camera 1 and a cigarette support assembly 2. The remaining parts of the apparatus may be accommodated in a control panel or desk at whatever location may be convenient.

It will be understood that the vidicon camera 1 is arranged to scan each successive cigarette delivered to the apparatus, in a plurality of line scans during rotation of the cigarette about its axis, while pick-offs in assembly 2 deliver output signals at selected points in the rotation. Referring first to FIGURE 1, the vidicon camera 1 has a line time-base generator 3 and a field time-base generator 4 connected to it in conventional manner. Output from the camera 1 is delivered via a video amplifier 5 and a differentiating circuit 6 to an amplitude discriminator 7. Discriminator 7 has three output lines 8, 9, 10, and is arranged to deliver to line 8 the signal arising each time the scan crosses the leading edge of a cigarette; at this stage of the scan, the electric output of the vidicon camera will rise sharply, hence after amplification and differentiation the discriminator 7 will receive a sharp positive pulse of substantial amplitude. A similar pulse, but of negative polarity, reaches the discriminator 7 as the scan leaves each cigarette and the discriminator delivers these pulses to line 9. Pulses of notably greater amplitude are delivered to line 10. From line 10, feed-back is led via an integrating circuit 11 to amplifier 5 to afford automatic gain control.

Line 8 is connected via an inverter to one input of a two-input AND gate 12; the other input of gate 12 is connected to an output from a trigger or flip-flop circuit 13 so as to be energized whenever the trigger 13 is in the "set" or "1" condition. The state of trigger 13 is controlled by the line time-base generator 3 which has two auxiliary outputs 14, 15 connected respectively to set and reset inputs of the trigger 13. The generator 3 is arranged to give a main output of conventional saw-tooth form to the vidicon camera 1, but on each of the auxiliary outputs 14, 15 signals appear as the main output voltage reaches predetermined levels. As each line scan commences in the vidicon camera 1, the main output from time-base generator 3 will be zero, commencing to rise, and trigger 13 will be in the reset condition. When the scan has passed an illuminated slit, whose purpose is later explained, a voltage will appear on auxiliary output 14 to set trigger 13; until this happens, trigger 13 will be maintaining gate 12 closed so that any pulse on line 8 cannot reach the set input of a trigger 16, but once trigger 13 is set, gate 12 is opened, then when later the scan reaches the start of the cigarette, there appears at the input of discriminator 7 a pulse sufficiently large to reach line 8, and this start of cigarette indication passes gate 12 to set trigger 16.

At a later stage in the scan, corresponding to a higher output voltage on the main output of generator 3, a voltage appears on auxiliary output 15 and trigger 13 is reset. While trigger 13 is set, however, as well as gate 12 being closed a further gate 17 is closed, as the latter gate receives an inhibit voltage from the trigger 13 whenever the latter is set. The gate 17 receives pulses from line 10 via an inverter 18, and its output is connected to both inputs of a trigger 19 so that, whatever the condition of trigger 19, a pulse from line 10, if gate 17 is not inhibited, will reverse its state.

Returning to trigger 13, this trigger is in the reset condition at the start of each line scan. Gate 12 is therefore closed but gate 17 is open, not being inhibited, and any pulse on line 10 reaches trigger 19. The latter is in the reset of "0" state at the start of the scan, and a pulse appears on line 10 as the scan passes the illuminated slit previously mentioned—illumination of the slit ensures that as the scan passes it, vidicon camera 1 produces a large rise in output, hence a large enough pulse reaches discriminator 7 to give an output on line 10. Trigger 19 accordingly is set and opens gate 20, which is also controlled by a trigger 21. At this time, however, trigger 21 (which is provided for testing purposes as explained later) is not inhibiting gate 20, which allows pulses produced by a 2 mc./s. crystal oscillator 22 feeding a shaper circuit 23 to reach a two-denomination decimal counter 24. This condition persists until, late in the scan, when the scan must have passed beyond the cigarette to be gauged, the time-base generator 3 delivers an output on line 15 and trigger 13 resets; gate 17 is reponed as it ceases to be inhibited. After this the scan encounters a further illuminated slit, and as before this leads to the appearance of a pulse at the connected inputs of trigger 19 which accordingly resets, closing gate 20 to cut off the supply of 2 mc./s. pulses to the counter 24.

It will be seen that the counter 24, therefore, receives 2 mc./s. pulses throughout the time occupied by the scan in moving from one illuminated slit to the other, which is a fixed distance. As the oscillator 22 is crystal-controlled, its output frequency is constant and thus the number of pulses received by counter 24 during each line scan is inversely proportional to the linear speed of scanning. Variation in the count attained in each line scan are used to stabilise the frequency of time-base generators 3 and 4.

Before proceeding to describe this stabilisation of generator 3, it may be noted that counter 24 has only two denominations as the variation in count per scan is sufficiently indicated by the last two decimal digits of the number of 2 mc./s. pulses per line scan; indeed, only the units digit value is used for stabilisation, the tens denomination of counter 24 being connected to a fault indication circuit, as an error of ten or more in the count is deemed excessive.

To allow stabilisation of the time-base generators 3 and 4, they are provided with control elements 25, 26 respectively such as variable resistors or potentiometers, both mechanically coupled to a servo-motor 27. The units denomination of counter 24 is arranged to deliver a D.C. voltage representative of the count reached via a gate 28 and integrating circuit 29 to one input of an adder 30; the other input of adder 30 is derived from a potentiometer 31 and the output of the adder 30 is delivered to the servo motor 27 via a gate 32 and amplifier 33.

The counter and integrating circuit together apply to the adder a D.C. voltage in the range of 0 to −6 volts, the value within this range being determined at any instant by the count reached, and potentiometer 31 allows any preselected voltage from 0 to +6 volts to be applied to the adder. If the two inputs of the adder receive equal but opposite voltages, no output is produced. If however an incorrect count is obtained and potentiometer 31 has been set to give an output equal in magnitude to that derived from the counter when the count is correct, then the adder will give an output representing in magnitude and sign the error in the count and servo-motor 27 will be energised and drive elements 25, 26 until a balance is achieved.

The gate 28 is normally open but is closed by an inhibit voltage derived from trigger 19 via an inverter/buffer 34 whenever trigger 19 is set, so that the servo-motor control is not affected by the varying count in counter 24 while 2 mc./s. pulses are being fed to it.

The tens denomination of counter 24 is arranged to produce a D.C. output on one of ten output lines, corresponding to the ten decimal digits, according to its stored count. A ten-way switch 35 connects any selected one of these lines, corresponding to a correct count, to a gate 36 and hence to an integrating circuit 37. The presence of voltage on the selected output line from the counter serves to inhibit gate 36, which also receives the output from inverter/buffer 34, thus whenever trigger 19 is reset, if a correct count is present in the tens denomination of counter 24 no input reaches integrating circuit 37. If the count is incorrect, gate 36 is not inhibited and integrating circuit 37 delivers an output which may be applied via line 38 to any convenient fault indicator (and may, of course, be used to arrest operation of the apparatus). When such a fault condition arises, the output on line 38 is also applied to gate 32 to inhibit the latter as there is no point in energising the servo-motor if the units count also happens to be incorrect.

The counter 24 requires to be reset to zero at the end of each line scan. For this purpose, the "flyback" of the saw-tooth output of generator 3 is available on an output line 39 and is delivered via a pulse shaper circuit 40, an inverter 41, and a gate 42 to a reset input of counter 24. Gate 42 has a second input normally energised so that the gate is open to reset pulses.

Provision is however made for checking the operation of counter 24. Operation of a push-button two-pole changeover switch 43 connects an output 44 of a pick-off in assembly 2 via an inverter 45 to the second input of gate 42, the output 44 delivering a pulse at the end of every twenty-fifth line scan, i.e. after completion of a complete scan for one cigarette. Thus while switch 43 is held operated the counter 24 is reset only at the end of every twenty-fifth line scan, when coincidence of the pulse on line 44 and the line fly-back on line 39 occurs. Between successive resettings of counter 24, trigger 19 operates normally, i.e. changes its state every time the scan passes one of the illuminated slits, thus during each line scan counter 24 receives 2 mc./s. pulses while the scan passes from one slit to the other; as in this time the counter is not reset, at the end of the twenty-fifth line the counter will store the tens and unit digits of the total number of 2 mc./s. pulses received during the twenty-five scans from slit to slit. The count attained can be read from visual indicators 45 (e.g. glow tubes) connected to the counter 24.

Returning now to trigger 16, it will be remembered that this is set by a pulse from output line 8 of discriminator 7, providing gate 12 has been opened by trigger 13, which occurrs after the scan has passed the first illuminated slit. Due to the arrangement of discriminator 7, trigger 16 in fact is set when the scan reaches the leading edge of a cigarette. Resetting of trigger 16 occurs at the time of flyback of the saw-tooth waveform of generator 3; the reset input of trigger 16 being connected to receive the output of pulse shaper circuit 40.

While trigger 16 is set, a gate 46 is open, and the 2 mc./s. pulses from oscillator 22 and pulse shaper circuit 23 pass through gate 46 to a main counter 47, which at the beginning of each line scan stands at zero, being at 999 immediately before each line scan starts, and moved on to zero by the pulse which appears as the scan first encounters the cigarette. Counter 47 has three decimal denominations. Throughout each line scan, therefore, the count in main counter 47 is increasing by one unit every half-microsecond. The line time-base maintains a constant linear speed of scan of 2000 metres per second, thus the count in counter 47 increases by one unit for each 0.1 mm. of scan.

Counter 47 has ten output lines from each denomination, these output lines connected to a plurality of groups of single-pole ten-way switches 48–53. Each switch group has as many switches as the counter 47 has denominations, in this case three, e.g. switch group 48 has three switches 48h, 48t, 48u, respectively connected to the hundreds, tens and units denominations output lines of counter 47. Specifically, each switch has its ten fixed contacts connected in order to the ten output lines of the associated denomination of counter 47. Each switch group has an associated three-input AND circuit, the movable contact of each switch in the group being connected to a separate input of the associated AND circuit. Inverters 60 are included in the connections between the switch groups and AND circuits.

Switch groups 48, 49 have associated AND circuits 54, 55 respectively and the output of AND circuit 54 is connected to the reset input of a trigger 61 while the output of AND circuit 55 is connected to the set input of the same trigger. This trigger 61 has a second reset input connected to the output of pulse shaper circuit 40 so that trigger 61 is reset at the end of each line scan in any event.

The counter 47 is arranged so that each denomination always causes a voltage to be maintained on one, but no more, of its output lines, which one depending upon and representing the count stored in that denomination. While various types of counter are capable of this, at present we prefer to employ a four-trigger binary counter with feed-back connections of known type serving to make certain states transient and hence convert the counter to decimal operation; to energise the output lines as required we employ a diode decoding matrix with a separate buffer in each output. Preferably the counter triggers and the buffers are all transistor stages.

Assume now the switches of groups 48 have been set to the number 705, i.e. switch 48h connects to the 7-representing output line of the hundreds denomination of the counter, and so on. When the counter reaches a count of 705, all three inputs of gate 54 will be energised via switch group 48, hence trigger 61 will be reset. Similarly, if switches 49 are set to the number 695, when the count reaches that number the trigger 61 will be set (through AND circuit 55). Thus in each line scan trigger 61 will remain reset until a count of 695 is reached, i.e. the scan has covered 69.5 mm. from the leading edge of the cigarette, and will then be set and remain set until the counter reaches 705 (scan of 70.5 mm.) whereupon it will be reset.

While trigger 61 is set, it applies an input to a gate 62 whose other input is connected to line 9 and therefore receives a pulse whenever the scan reaches the end (i.e. the trailing edge) of a cigarette. If this end of cigarette pulse appears while the scan is between 69.5 and 70.5 mm. from the leading edge of the cigarette an output is delivered by gate 62 and a trigger 63 is set.

It will be seen, therefore, that if trigger 63 is in the set condition as the end of a line scan is reached, this is an indication that the length of the cigarette is between the values represented by the settings of switch groups, 48, 49, i.e. between 69.5 and 70.5 mm. in the example cited. At the end of the line scan, i.e. at flyback, trigger 63 is reset by a pulse from shaper circuit 40 via an inverter/buffer 71.

The length of tip on the cigarette is checked in a manner generally similar to the length checking just described, using the counter 47, switch groups 50, 51, AND circuits 56, 57, and trigger 64. In this case, when trigger 64 is set and energises a gate 65, the second input of the gate is derived from a fourth output 66 from discriminator 7, this fourth output receiving all pulses delivered to discriminator 7 which are above a selected noise level but not of correct amplitude and/or sign to reach lines 8, 9, or 10. The output 66 is first applied to a unit 67 containing a transformer and a full-wave rectifier so arranged that all pulses are given the same polarity and then to one input of a three-input AND gate 68. The second input of gate 68 is connected to the set output of trigger 13 which controls gate 12 as previously described, and the third input to the output of shaper circuit 23. The gate 68 therefore allows pulses from unit 67 to pass to an inverter 69 wherever trigger 13 is set i.e. from just after the scan passes one illuminated slit to just before it reaches the other, but the pulses do not preserve their form but are "chopped" at 2 mc./s., i.e. for each original pulse reaching gate 68 from unit 67, inverter 69 receives a number of shorter pulses corresponding to the number of 2 mc./s. pulses delivered by shaper circuit 23 while the original pulse from the unit 67 is above the pass level of the gate 68.

The second input of gate 65 thus receives pulses derived from printing or marks on the cigarette as well as pulses derived from detection of the tip but as the latter will be of notably greater amplitude, gate 65 is set to open only on the tip-representing pulses. As soon as both inputs of gate 65 are energised, a trigger 70 is set and remains in that condition until flyback of the scan, as its reset input is connected to the output of shaper circuit 40 via the inverter/buffer 71 as is that of trigger 63. Thus at the end of each line scan, trigger 70 will be set if a pulse representing the end of the cigarette tip is received at gate 65 while the scan is between limit positions represented by the settings of switch groups 56, 57.

Further triggers 72, 73 are provided to give an indication if both the total length and tip length of a cigarette are correct. Both these triggers 72, 73 are in the reset condition at the start of a first line scan and at the end of that line scan, trigger 73 receives a pulse from shaper circuit 40 tending to set it; however if triggers 63 and 70 have both been set during the line scan, indicating total length and tip length respectively as correct, then their set outputs open an AND gate 74, allowing the pulse from shaper circuit 40, inverted by an inverter 75, to reach OR gate 76 and hence the reset input of trigger 72. In this event trigger 72 is not switched as it is simultaneously energised at set and reset iputs, the latter prevailing. If however the total length and/or the tip length of the cigarette is incorrect, then by the end of the scan one or other of triggers 63, 70 would be in the reset condition, and gate 74 would not be open to the pulse via inverter 75; trigger 72 therefore sets and delivers a pulse to trigger 73 which also sets. This trigger 73 is only reset at the end of a field, i.e. 25 line scans, by a pulse from the field time-base generator 4 via a pulse-shaper circuit 77 (similar to shaper circuit 40) and a buffer 78. The pulse via buffer 78 is also employed to reset trigger 72 via OR gate 76.

At the end of a field, therefore, trigger 73 will be in the reset state if the total length and tip length have been found correct on each and every line scan, but will be in the set condition if either dimension has been found outside the selected limits on any one line scan and will then inhibit an AND gate 79.

A trigger 80 operates in association with switch groups 52, 53 and counter 47 in similar manner to trigger 61 with switch groups 48, 49 and the counter, but switch groups 52, 53 are set to represent the limits within which printing may be detected on each line scan. While the scan is between these limits, trigger 80 is reset and delivers an output tending to open gate 81, which also has inputs from triggers 61, 64 which inhibit gate 81 when either of triggers 61, 64 is set, i.e. while the scan is between the selected limits for pulses representing the leading edge or the end of the tip of the cigarette. However, in the absence of such inhibition, gate 81 opens and pulses ("chopped" at 2 mc./s.) from inverter 69 are allowed to reach a counter 82.

The total number of pulses reaching counter 82 during a complete field affords what may be termed a statistical indication of the extent and quality of printing on that area of the cigarette scanned between the limits set by switch groups 58, 59. Pulses delivered by discriminator 7 via unit 67 will be of amplitude and shape determined by the density and width of print strokes traversed by the scan, but the introduction of the 2 mc./s. oscillations at gate 68 serves to produce for each pulse from the unit 67 a number of pulses depending not only upon the duration of that pulse, but also upon its amplitude whenever it is of other than "square" shape. Limits can therefore be determined for the total count reached in counter 82 during a field scan which correspond to permissible variation in print extent and quality. These limits are set on switch groups 83, 84 which co-operate with the counter 82 AND gates 85, 86, and a trigger 87 in similar manner to switch groups 48, 49, counter 47 AND circuits 54, 55 and trigger 61. Hence at the end of each field scan the trigger 87, which was initially in the reset condition, will be set if the total count in counter 82 is between the selected limits and reset if such count is below or above said limits.

Whenever gate 81 is held closed by trigger 80, an input tending to open a further gate 88 is delivered by said trigger, gate 88 having other input similar to those of gate 81. Thus, whenever gate 81 is closed and gate 88 is not inhibited by trigger 61 and/or trigger 64, pulses from inverter 69 are delivered to a counter 89. Such pulses represent undesired marks on the cigarette, including displaced print, excluding the desired print area and the tip. The counter 89 co-operates with switch groups 90, 91, AND gates 92, 93 and a trigger 94 in the same manner as the other similar assemblies already described, and in the result at the end of each field scan the trigger 94 is in the set condition if the total in counter 89 is within selected limits but otherwise reset.

If the counts in both counters 82, 89 are within selected limits, therefore, at the end of a field scan both triggers 87, 94 are set and will energise two inputs of gate 79; if cigarette length and tip length were found correct on every line of the field, trigger 73 will not be inhibiting gate 79 and therefore an input will be delivered to a further gate 95 to inhibit the transmission of a pulse from shaper 77 via an inverter to a reject pulse generator 97; if however trigger 87 and/or trigger 94 is reset, and/or trigger 73 is set, gate 95 will not be inhibited and the generator 97 will receive a pulse through gate 95. A consequential output pulse from generator 97 will appear on line 98 and may be used, for example, to energise a solenoid (not shown) arranged to cause physical displacement of the gauged cigarette to a reject channel.

It may be noted that visual indicators 99 are connected to counters 82, 89 and as with indicators 45, the indicators 99 may take various forms, e.g. glow tubes.

When the apparatus is employed at high speeds, the visual indicators will not be visually readable as their indications will change too fast for the eye to follow. We may therefore provide a data-storage unit as a buffer between the counter and the indicators, so connected that the data derived from each cigarette passes to storage, and the storage unit is connected to indicators to reset the latter at timed intervals i.e. corresponding to every so many cigarettes. The visual indicator will then give a sampling indication, while the complete data fed to storage may be dealt with by any desired form of output recorder, and/or may be used to produce average readings.

In considering the above description, it should be noted that correct sequencing of operation of the various circuit elements is in most cases essential and where there is a possibility of operation in incorrect order, it may be necessary to introduce delay circuits to ensure the desired sequence. For example, when counter unit 47 and trigger 61 are to be reset, it may be of advantage to delay the response of the trigger 61 to ensure that it cannot reset before the unit 47, although as above described it should normally be sufficient that both circuits reset simultaneously.

Turning now to FIGURE 2, the cigarette support assembly 2 comprises a pair of discs 100 secured to a shaft 101 for rotation therewith and carrying between them twelve rollers 102 symmetrically disposed around the axis of shaft 101 (one of the discs 100 is of course not seen, being in front of the plane of the drawing). Discs 100 are in operation driven clockwise and rollers 102, via suitable gearing (not shown) are also driven clockwise.

A conveyor belt 103 runs to a roller 104 parallel to shaft 101 immediately below the discs 100, said belt having flutes 105 designed to accommodate cigarettes 106. It will be seen that roller 104 is sufficiently close to rollers 102 to bring the cigarettes 106 into contact with the rollers 102.

To the left of the discs 100 a further roller 107 is placed, also parallel to shaft 101, and from roller 107 a twin-belt conveyor 108 extends away from discs 100 and rollers 102. Between the two belts of conveyor 108, the roller 107 is enlarged as shown at 109 and has external longitudinal flutes 110 to accommodate cigarettes.

The roller 107 and discs 100 are connected by gearing (not shown) to a common drive so that, during rotation of these members, as each flute 110 on the enlarged portion 109 of roller 107 makes its closest approach to the discs 100 such flute is in register with a space 112 between two adjacent rollers 102. Similarly the flutes 105 of belt 103 are arranged to come into register with the spaces 112. The cigarettes 106 may therefore travel, as shown, in flutes 105 on belt 103 until they enter the spaces 112, then round with the discs 100 and rollers 102 until the enlarged portion 109 of roller 107 is encountered, and thence in a flute 110 to one of the flutes on the twin-belt conveyor 108 (which is appropriately positioned relative to roller 107).

In travelling with discs 100 and rollers 102, the cigarettes 106 are generally below the rollers 102 and required to be supported; this is done by air pressure. Between the rollers 102 is a cylindrical member 113, arranged to rotate with shaft 101 and discs 100, which is of such diameter as to have only a small working clearance 111 from each roller 102. The member 113 has a plurality of longitudinal bores 114, one in register with each space 112, and each of said bores 114 is connected by drillings 115 to the surface of member 113. All the bores 114 extend through one of the discs 100 and their open ends are normally stopped by a stationary end-plate 116. The end-plate 116 has, however, an arcuate slot 117 arranged to register at any instant with the bores 114 whose associated space 112 are at that instant in the path of cigaretes 106, i.e. are in the 90° arc from a position adjacent roller 104 to a position adjacent roller 107. On the far side of end-plate 116 from the adjacent disc 100, the slot 117 is connected to the inlet of an air-pump (not shown).

The air-pump is arranged to produce a sufficiently reduced pressure in those of the spaces 112 which are at any instant connected to it (via drillings 115, bores 104 and slot 107) to cause cigarettes 106 to be held in spaces 112 by the difference between the atmospheric pressure acting on the lower side of each cigarette and the reduced pressure in the spaces 112 produced by the air-pump.

The enlarged portion 109 of roller 107 similarly has suction applied through drillings to its flutes 110 to ensure that whenever a flute 110 engages a cigarette 106 held in a space 112, that cigarette will be held in the flute 110 upon separation of that flute 110 from the space 112 with continued rotation of roller 107 and discs 100. Once retained in the flute 110, each cigarette travels with roller 107 through some 120° of revolution of said roller and then the ends of the cigarette encounter belts 108, which receive the cigarette in one of their flutes. The application of suction to retain the cigarettes in flutes 110 need therefore only be effective while the flute travels from the point at which a flute 110 comes nearest to discs 100, where a cigarette may be picked up, to a point where gravity is sufficient to retain the cigarette in the flute, e.g. vertically above the axis of roller 107. This application of suction over a limited range most conveniently is effected as described with reference to the spaces 112, where the position and extent of the arcuate slot 117 govern the connection of each space 112 to the air-pump (not shown).

As each cigarette is held in a space 112 against a pair of rollers 102, it travels with discs 100 and passes across the field of view of the vidicon camera 1. Due to the clockwise rotation of the rollers 102, the cigarette will rotate anticlockwise and thus as it passes across the field of the camera successively different aspects of the cigarette are visible to the camera which thus "sees" a developed view of the outer surface of the cigarette. The speeds of rotation of discs 100 and rollers 102 are set in relation to the dimensions of the various parts and the characteristics of the optical system of the camera 1 so that a suitably sized image of said developed view of the cigarette surface appears on the image plate of the vidicon camera. Illumination of the cigarettes while they are in the field of view of the camera is provided by lamps 118, 119 on either side of camera 1.

The illuminated slits to which reference has been made in connection with FIGURE 1 are not shown in FIGURE 2, but may be provided, for example, on the end-plate 116 as indicated diagrammatically at 120. Each slit, of course, is formed in a front face of a small box containing an electric bulb and such reflectors and/or diffusers and/or lenses are fitted in known manner as may be needed to concentrate the light delivered by the bulb in a parallel beam through the slit towards the camera 1. The rollers 102 need to be of sufficient length to allow a cigarette thereon to be "seen" by camera 1 without obstruction by the slits (or, more precisely, the boxes containing the slits).

Various changes or modifications are possible without departure from the scope of the invention, e.g. the boxes containing illuminated slits just mentioned may be replaced by strips of highly reflective material, or by mirrors reflecting images of slits produced elsewhere, e.g. in apparatus adjacent to camera 1.

What I claim as my invention and desire to secure by Letters Patent is:

1. Gauging apparatus for measuring linear dimensions of articles such as cigarettes, comprising means including a constant-frequency time-base generator for scanning an article in a predetermined pattern and producing an electric output representative at any instant of the reflectance of the part of the article then being scanned, an oscillator adapted to operate at constant frequency, and gate means arranged to respond to predetermined changes in said electric output to control delivery of oscillations from said oscillator to at least one counter, including feedback means arranged to stabilize the scanning means, said feedback means comprising a pair of markers within the field of scan but sufficiently separated to allow placing of an article to be scanned therebetween, and control means responsive to changes in the electric output as the scan encounters said markers to determine the operating frequency of said time-base generator.

2. Apparatus as claimed in claim 1, in which the scanning means is arranged to scan the article at constant velocity.

3. Apparatus as claimed in claim 1, in which the scanning means comprises a vidicon tube.

4. Apparatus as claimed in claim 1, in which the scanning means comprises a flying-spot scanner in association with a photo-electric detector.

5. Apparatus as claimed in claim 1, in which said control means comprises means responsive to said changes in electric output and arranged to control access of oscillations from the oscillator to a further counter, said further counter being arranged to supply a D.C. voltage, representing variations from a desired ratio of the count attained as the scan passes between the markers, to a servo motor arranged to adjust a frequency control for the time-base generator in a variation-cancelling sense.

6. Apparatus as claimed in claim 5, in which said markers are illuminated slits.

7. Apparatus as claimed in claim 1, in which the scanning means is arranged to cover a plurality of closely spaced parallel lines along the length of the article.

8. Apparatus as claimed in claim 7, including a separate counter arranged to count the number of small changes in the electric output produced by such marks as printed matter on the article.

9. Apparatus as claimed in claim 8, including means for converting said small changes into discrete triangular pulses of amplitude corresponding to said changes and a gate responsive to said triangular pulses to control admission of oscillations from the oscillator to the separate counter.

10. Apparatus as claimed in claim 1 in which the scanning means includes means for moving the article scanned so that different areas of the surface of the article are presented for successive lines of scan, said article moving means comprising a plurality of rollers symmetrically mounted on at least one rotatable disc and means for driving both the disc and the rollers in the same sense so that the surface of a cylindrical article resting between two adjacent rollers moves relatively slowly at right angles to the direction of scanning, and including a member rotatable with the rollers and having an arcuate slot of progressively varying width, a light source and a photoelectric cell disposed one on each side of the slot, and means for controlling the scan in response to output from the photo-electric cell.

References Cited by the Examiner
UNITED STATES PATENTS

| | | | |
|---|---|---|---|
| 2,798,966 | 7/1957 | Summerhayes | 250—219 |
| 2,910,908 | 11/1959 | Meyer | 250—219 |
| 3,026,415 | 3/1962 | Lake et al. | 250—219 |
| 3,180,995 | 4/1965 | Briggs et al. | 250—233 |
| 3,222,979 | 12/1965 | Webster | 250—223 X |

RALPH G. NILSON, *Primary Examiner.*

J. D. WALL, *Assistant Examiner.*